April 18, 1933.    H. KREIDEL    1,904,866
JOINT FOR PIPES
Filed March 15, 1930

INVENTOR
HANS KREIDEL
By
ATTORNEYS.

Patented Apr. 18, 1933

1,904,866

UNITED STATES PATENT OFFICE

HANS KREIDEL, OF WIESBADEN, GERMANY

JOINT FOR PIPES

Application filed March 15, 1930, Serial No. 435,992, and in Germany December 27, 1929.

The subject of the present invention is a joint for pipe connections of that type in which the metal jointing member is secured solely by tightening a screw connection on the pipe and there is formed a seat similar to a rim which holds it in the longitudinal direction and renders it capable of taking up longitudinal stresses which may act on the pipe without auxiliary means.

The present joint differs from known joints in that the jointing member forms from metal which may be deformed a closed and single piece sleeve having vertical pressing surfaces and adapted to be fitted on the pipe, against which sleeve a separate screwed pressure member is capable of exerting an axial moving pressure whilst a hollow conical bore of the connecting member, which with the inserted pipe forms an annular space reduced towards the direction of tightening and into which the packing sleeve is so pressed into the widest portion of the annular space, preferably of the same area, that by contracting the pipe and whilst being deformed closely bears for a long distance against the wall of the pipe and the hollow conical bore of the connecting member.

In this manner there is obtained a readily detachable joint which is fluid tight at pressures up to 300 pounds and above. When forcing in the packing sleeve axially its free end is immediately forced into the wall of the pipe whilst forming a depression and on further forcing in the pipe is moved such a distance until the packing sleeve bears internally tightly against the outside of the pipe whilst its outside bears tightly against the hollow conical bore of the connecting member. For increasing the pressure between the engaging surfaces the packing sleeve may be provided with an enlarged bearing flange.

In the accompanying drawing there is illustrated by way of example a method of carrying the invention into effect as applied to a connecting member for two pipes.

Figure 1:
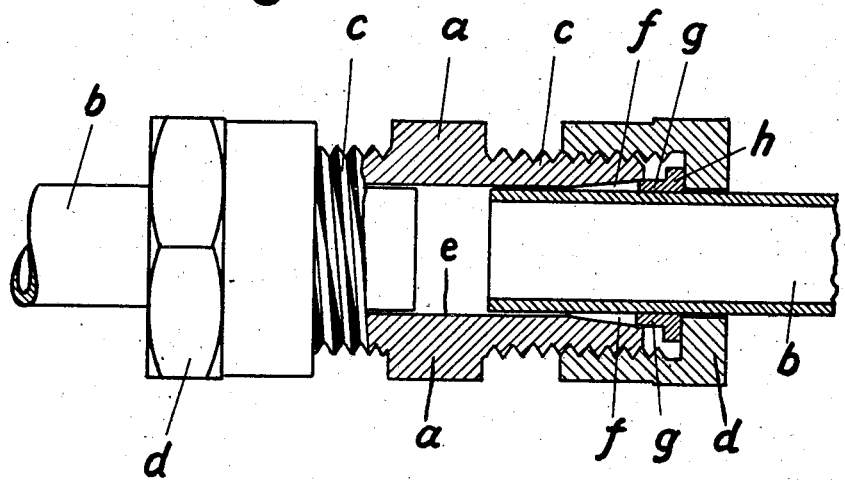
Figure 2:
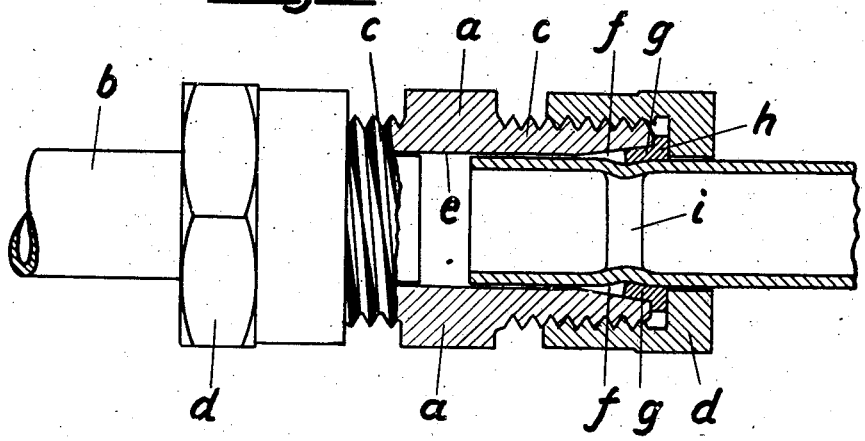

Figure 1 shows a connection wherein one half is in elevation and the other half in horizontal section before completing the joint, and Figure 2 shows a similar view after the joint has been completed and the packing sleeve has been pressed home.

$a$ is the connecting member provided with tubular extensions $c$ adapted to receive the two pipes $b$ to be connected together. The tubular extensions $c$ are provided with external threads on which are adapted to be screwed pressure members $d$ which are in the form of cap nuts. In the central cylindrical portion $e$ of the connecting member $a$ the free ends of the pipes $b$ are movably guided. This cylindrical portion $e$ of the connecting member is enlarged towards the ends of the tubular extensions, that is to say enlarged outwardly, by slightly inclined conical bores $f$ of which the angle of inclination amounts to about 12°. Each conical bore $f$ forms with the corresponding pipe $b$ an annular space which is gradually reduced in area towards the interior of the connecting member. $g$ is a single piece closed cylindrical packing sleeve of metal capable of being deformed and provided with a pressure surface $h$ which is enlarged in the form of a flange and extends at right angles thereto.

The thickness of the packing sleeve $g$ corresponds substantially with the widest portion of the annular space formed between the outside of the pipes $b$ and the inner surface of the conical bore $f$.

When tightening the pressure member $d$ axial pressure is exerted upon the portion of the packing sleeve $h$ adjacent thereto. By this axial pressure in combination with the action produced by the reduction of the conical bore $f$, the free end of the packing sleeve $g$ is compressed. At the same time the corresponding pipe $b$ is provided with an inward enlargement $i$ (Figure 2) which renders movement of the packing sleeve on the pipe impossible. On further increase of the pressure on the sleeve the pipe is moved a short distance therewith and the packing sleeve $g$ is so deformed that for some distance it bears tightly against the wall of the pipe and the inner wall of the hollow conical bore of the connecting member $a$. By wedging the packing sleeve into the gradually reducing space between the pipe and the conical bore there is simultaneously applied a strain to the screw thread and thus a firm seating of the pressure member. It will be understood that instead of the connecting member above described the new pipe connection may be provided with any other suitable pressure member.

I claim:—

1. A joint for making a fluid pressure tight connection with a metallic tube, comprising a body having a bore to receive the extremity of a tube, said bore having an outwardly flared portion at the tube receiving end of said body, a hollow cylindrical metallic pressure sleeve having an external diameter approximately as great as that of the flared portion of said bore at its point of greatest diameter, said sleeve having an internal diameter slightly greater than the external diameter of the tubing with which it is to be used, and means to force said sleeve into the flared portion of said bore thereby to deform said sleeve and force it inwardly against the tube to an extent sufficient to form an inwardly extending annular bead upon the latter whereby said sleeve will be locked to said tube in fluid tight relationship and a peripheral shoulder on said sleeve engageable between the flared end of said body and the sleeve forcing means for limiting the inward movement of said sleeve into said body.

2. A joint for making a fluid pressure tight connection with a metallic tube, comprising a body having a bore to receive the extremity of a tube, said bore having an outwardly flared portion at the tube receiving end of said body, a hollow cylindrical metallic pressure sleeve having an external diameter approximately as great as that of the flared portion of said bore at its point of greatest diameter, said sleeve having an internal diameter slightly greater than the external diameter of the tubing with which it is to be used, said sleeve also having an outwardly extending annular flange at one end thereof, and means having threaded engagement with said body for applying pressure to the flanged end of said sleeve thereby to force the latter into said flared bore, whereby said sleeve will be forced radially inwardly to form an annular inwardly projecting bead thereon, the end portion of said sleeve thereby tightly engaging said tube and forming a fluid tight joint between said body and said tube the angular flange of said sleeve being engageable with the flared end portion of said body for limiting the inward movement of said sleeve into said bore.

3. A joint for making a rigid fluid pressure seal with a metallic tube, comprising a body having a cylindrical bore for freely receiving the extremity of a tube of smaller external diameter than the diameter of said bore, said bore terminating in an outwardly flared portion at the tube receiving end of said body, a hollow cylindrical metallic pressure sleeve having an external diameter approximately as great as that of the flared portion of said bore at its point of greatest diameter and an internal diameter slightly greater than the external diameter of the tubing with which it is to be used, the tubing being receivable in said bore any one of a plurality of lengths and sufficient to provide a surface for engagement with said sleeve, means to force said sleeve into the flared portion of the bore thereby to deform said sleeve and force it radially inwardly against the tube to an extent sufficient to form an inwardly extending annular bead upon the latter whereby said sleeve will be locked to said tube in fluid tight relationship, and a peripheral shoulder on the outermost end of said sleeve engageable between the end of said body and the sleeve forcing means for limiting the inward movement of said sleeve into the flared portion of said body.

In testimony whereof I affixed my signature.

HANS KREIDEL.